No. 759,111. PATENTED MAY 3, 1904.
I. H. JOHNSON, Jr.
VARIABLE SPEED GEAR FOR MOTOR DRIVEN LATHES OR OTHER TOOLS.
APPLICATION FILED JUNE 3, 1903.
NO MODEL. 3 SHEETS—SHEET 1.

Witnesses:
Hamilton D. Turner
Herman E. Mihus

Inventor:
Israel H. Johnson, Jr.
by his Attorneys,

No. 759,111. PATENTED MAY 3, 1904.
I. H. JOHNSON, Jr.
VARIABLE SPEED GEAR FOR MOTOR DRIVEN LATHES OR OTHER TOOLS.
APPLICATION FILED JUNE 3, 1903.
NO MODEL. 3 SHEETS—SHEET 2.

Witnesses:-

Inventor:-
Israel H. Johnson, Jr.,
by his Attorneys:

No. 759,111. PATENTED MAY 3, 1904.
I. H. JOHNSON, Jr.
VARIABLE SPEED GEAR FOR MOTOR DRIVEN LATHES OR OTHER TOOLS.
APPLICATION FILED JUNE 3, 1903.
NO MODEL. 3 SHEETS—SHEET 3.

Witnesses:-
Hamilton D. Turner
Herman E. Mehus

Inventor:-
Israel H. Johnson Jr.
by his Attorneys;
Howson & Howson

No. 759,111. Patented May 3, 1904.

UNITED STATES PATENT OFFICE.

ISRAEL H. JOHNSON, JR., OF PHILADELPHIA, PENNSYLVANIA.

VARIABLE-SPEED GEAR FOR MOTOR-DRIVEN LATHES OR OTHER TOOLS.

SPECIFICATION forming part of Letters Patent No. 759,111, dated May 3, 1904.

Application filed June 3, 1903. Serial No. 159,944. (No model.)

*To all whom it may concern:*

Be it known that I, ISRAEL H. JOHNSON, Jr., a citizen of the United States, residing in Philadelphia, Pennsylvania, have invented certain Improvements in Variable-Speed Gear for Motor-Driven Lathes or other Tools, of which the following is a specification.

The object of my invention is to provide means whereby a lathe or similar tool can be driven from an electric motor through change-gearing which can be quickly and accurately shifted so as to vary the speed of the spindle without altering the speed of the armature-shaft of the motor.

While my invention is especially designed to be used in connection with an electric motor, it will be understood that it can be used in connection with any suitable motor in which it is desired that the speed of the main shaft of the motor should not be varied.

The above object I attain in the following manner, reference being had to the accompanying drawings, in which—

Figure 1:
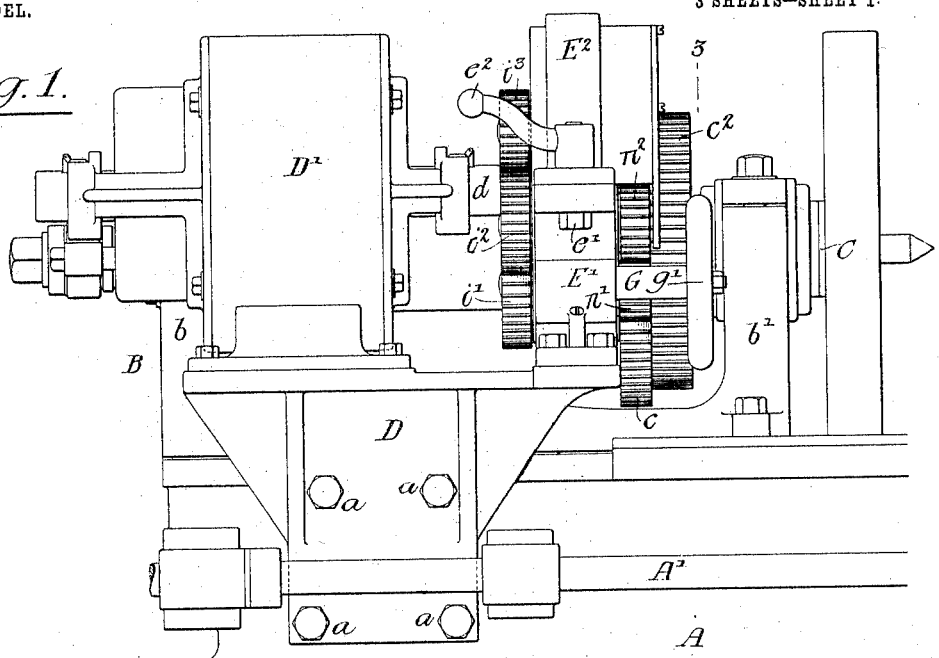
Figure 2:
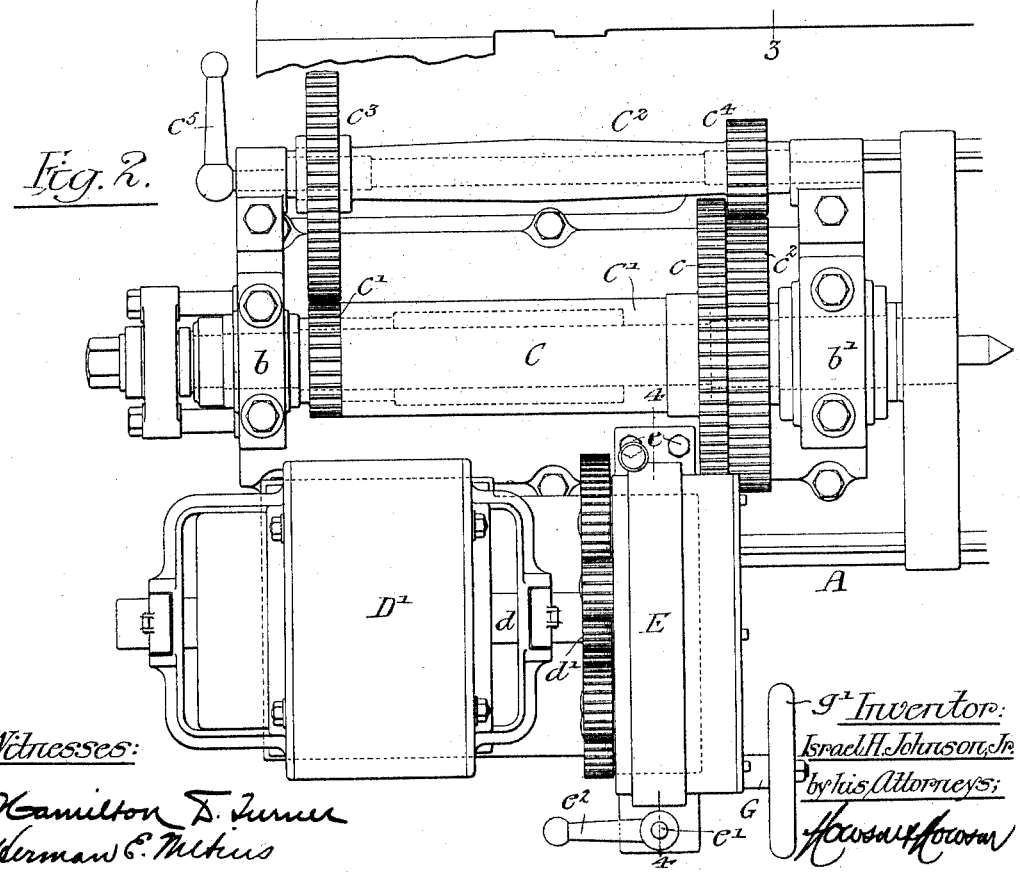
Figure 3:
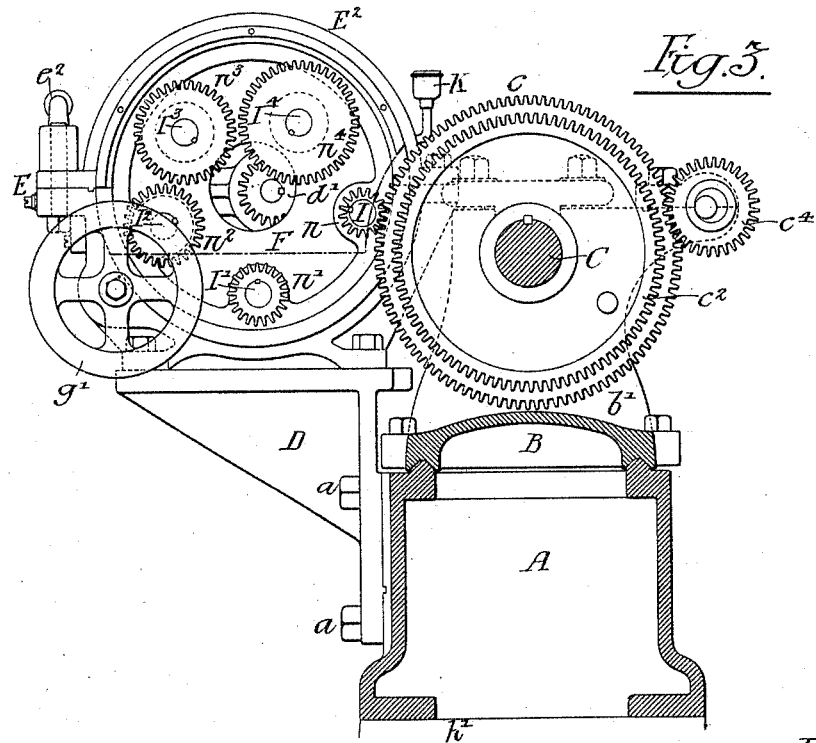
Figure 4:
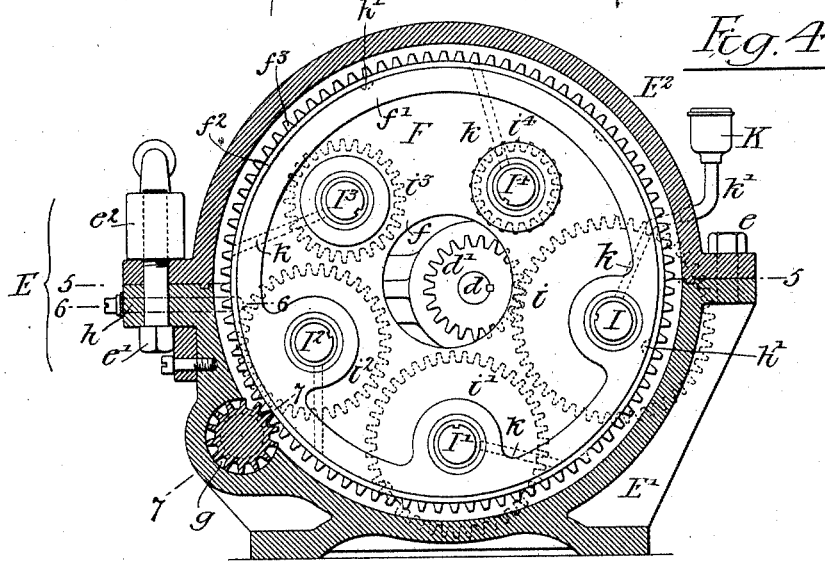
Figure 5:
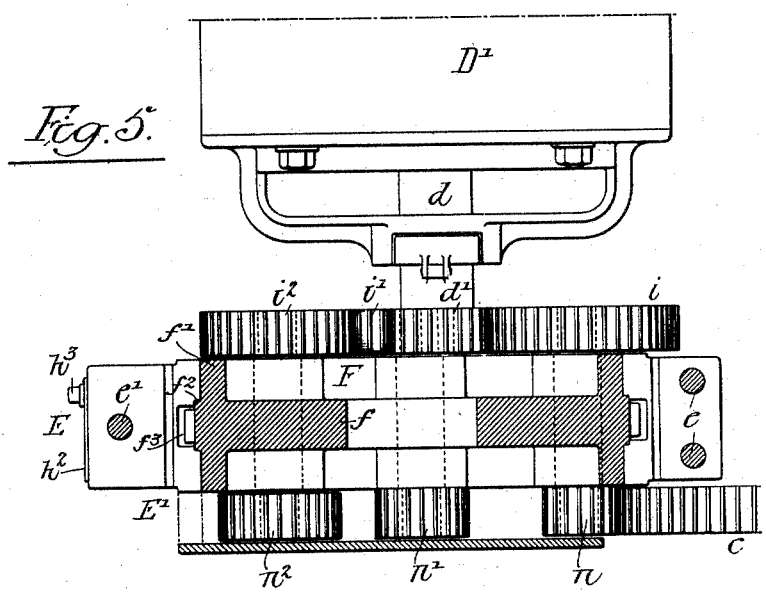
Figure 6:
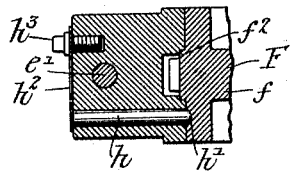
Figure 7:
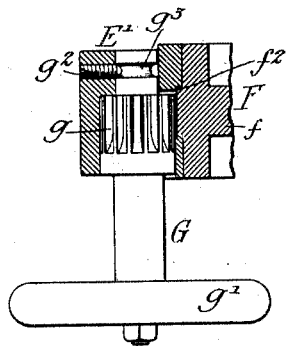

Figure 1 is a side view of the head portion of a lathe, illustrating my invention. Fig. 2 is a plan view of Fig. 1. Fig. 3 is a sectional view on the line 3 3, Fig. 1. Fig. 4 is a sectional view on the line 4 4, Fig. 2, drawn to an enlarged scale. Fig. 5 is a section on the line 5 5, Fig. 4. Fig. 6 is a section on the line 6 6, Fig. 4; and Fig. 7 is a section on the line 7 7, Fig. 4.

A is the bed of the lathe, supported in the ordinary manner.

B is the head-stock, carrying the bearings $b\ b'$ for the spindle C. Mounted on the spindle is a tubular shaft $C'$, having a gear-wheel $c$, by which the said tubular shaft is driven from the motor through the change-gear, which I will describe hereinafter. On the opposite end of this tubular shaft is a pinion $c'$, and on the spindle C is secured a gear-wheel $c^2$, the pinion and gear-wheel meshing, respectively, with the gear-wheel $c^3$ and pinion $c^4$ on the back-gear shaft $C^2$, which can be thrown into and out of gear by moving the handle $c^5$ in the ordinary manner. When the back-gear is thrown out, the spindle C and the tubular shaft $C'$ are locked together in the usual manner.

$A'$ is the feed-screw, which is geared to the spindle in the ordinary manner. This gearing has been omitted, as it is the same as in lathes of common construction and forms no part of my present invention.

Secured to one side of the lathe-bed is a bracket D. This bracket is secured to the bed by bolts $a$ in the present instance; but in some instances it may be cast integral with the bed, and the design of the bracket may be altered to accommodate different types of lathes without departing from my invention. Supported by this bracket D is a motor $D'$ and a casing E. The motor is of any suitable type having an armature-shaft $d$, and rigidly secured to the armature-shaft is a pinion $d'$. I have not shown the details of the motor, as these details form no part of the invention. The casing E is made in two parts, the base portion $E'$, Fig. 4, and the cap portion $E^2$. The cap portion is secured to the base portion at one side by bolts $e$ and at the opposite side by a bolt $e'$ and a handled nut $e^2$, so that when the nut is turned on the bolt it will draw the two sections together and firmly hold the bearing-disk F, which is mounted within the casing, rigidly in place.

The ring is formed as clearly shown in Figs. 4 and 5, and has a central web-section $f$ and an annular flange $f'$. Projecting from the central portion of the flange is a rib $f^2$, which holds the bearing laterally in place, and on the flange is an annular rack $f^3$, with which meshes a pinion $g$, which is mounted on a shaft G, Fig. 7, having a hand-wheel $g'$. The shaft is confined to the lower section $E'$ of the casing by means of a screw-pin $g^2$, which enters a groove $g^3$ in an extension of the shaft G. Other means of turning the bearing-disk F may be used without departing from the main feature of my invention.

Mounted in the bearing-disk F is a series of short shafts I $I'$ $I^2$ $I^3$ $I^4$, five in the present instance; but it will be understood that a greater or less number of shafts may be used, if desired. On each end of each shaft is a gear-wheel. The gear-wheels $i\ i'\ i^2\ i^3\ i^4$ are of such size and the shafts are so arranged in the bearing-disk that any of them will mesh with the pinion $d'$ on the armature-shaft $d$ of the motor when in proper position. In the present instance the gear-wheel $i$ on the shaft I is in gear with the pinion $d'$ on the armature-shaft D. The gear-wheels $n\ n'\ n^2\ n^3\ n^4$ on the opposite ends of the shafts I to I$^4$, inclusive, are so proportioned that they will mesh with the gear-wheel $c$ on the tubular shaft or sleeve C', which drives the spindle C of the lathe. In the present instance, as shown in Fig. 3, the pinion $n$ on the shaft I is in gear with the gear-wheel $c$.

It will be noticed that the bearing-disk is placed eccentric in relation to the armature-shaft $d$. By this arrangement only one shaft of the bearing-disk is in gear with the motor-shaft. Consequently all the other shafts remain idle until wanted and a train of gears is complete, as indicated in the drawings, from the armature-shaft $d$ through the pinion $d'$, gear $i$, shaft I, pinion $n$, and gear-wheel $c$, as indicated in the drawings. When it is desired to change the speed, all that is necessary is to turn the handled nut $e^2$, which will allow the bearing-disk to turn freely in the casing. Then by turning the shaft G the bearing can be turned so as to bring any one of the other shafts in line. In order to insure the bearing-disk stopping at the proper point, I mount a pin $h$, Figs. 4 and 6, in the lower section E' of the casing E. This pin enters notches $h'$ in the bearing-disk and is slightly supported by a spring $h^2$, confined to the casing by a screw-bolt $h^3$. Other types of spring-pins may be used without departing from my invention, and in some instances the pin may be entirely dispensed with; but by using the pin the operator can readily hear the click and then know that the gears are in proper alinement before drawing the sections of the casing together.

Formed in the bearing-disk and extending to each of the bearings for the shafts are ducts $k$ for lubricating material, and fixed to the upper portion of the casing in the present instance is a reservoir K for lubricating material, having a pipe $k'$, and when the bearing-disk is shifted so as to bring a certain shaft into alinement then the duct $k$ leading to that particular shaft is in communication with the oil-reservoir. By this construction only one shaft and that the one in motion is lubricated.

The operation of the mechanism is as follows: If, for instance, a certain speed is desired, the nut $e^2$ is first turned so as to release the bearing-disk. Then the bearing-disk is turned by means of the shaft G until the shaft having the proper combination of gears is entrain with the motor-shaft and the spindle, when the parts are locked by means of the nut and the current is applied to the motor. If it is desired to shift to another speed, all that is necessary is to again release the bearing-disk and turn the said disk by means of the shaft G until the desired combination is in line. It will thus be seen that the change in speed can be quickly made without encumbering the machine or tool with any complicated electrical mechanism and at the same time only one shaft of the series is in motion, the others remaining idle until brought into action.

I claim as my invention—

1. The combination of a driving-shaft, a pinion thereon, a driven shaft, a gear-wheel through which motion is imparted to said driven shaft, a bearing-disk, a supporting structure therefor, one of the members comprised by the structure and the disk having a guiding-flange and the other a recess therefor, a series of shafts carried by the bearing-piece, a plurality of gears on each of said shafts, one set of said gears being placed to mesh with the driving-shaft pinion and the other of said sets of gears being placed to mesh with the gear-wheel on the driven shaft, said parts being so arranged that when one shaft and its gears are entrain, the remaining shafts are out of action, substantially as described.

2. The combination of a driving-shaft having a pinion, a driven shaft, a gear-wheel for driving the same, a two-part casing, a bearing-disk mounted in the casing, means for clamping together the parts of the casing to prevent motion of the bearing-disk, means for moving said disk, shafts carried by the disk, each having a plurality of gear-wheels, one set of said gears being placed to mesh with the pinion on said driving-shaft and the other set being placed to mesh with the gear of the driven shaft, substantially as described.

3. The combination of a supporting structure, a bearing-disk mounted thereon, a series of shafts carried by the bearing-disk, a plurality of gears on each of the shafts, a driving-shaft having a pinion placed to be engaged by one set of said gears, a driven shaft having a gear placed to be engaged by the second set of said gears, there being lubricant-ducts in the bearing-disk communicating with the bearings of each shaft, a lubricator on the supporting structure having a conduit placed to aline with the duct of that particular shaft which is entrain with the pinions on the driving-shaft and with the gear on the driven shaft, substantially as described.

4. The combination of a driving-shaft having a pinion thereon, a driven shaft, a gear-wheel for driving said driven shaft, a two-part casing, a bearing-disk mounted in the casing, means for clamping the casing to the bearing-disk, an annular rack on the bearing-disk, a pinion on one portion of the casing meshing with the teeth of the rack so as to turn the bearing-disk, shafts carried by the bearing-disk, each shaft having a gear-wheel at each end, one set of gears meshing with the driving-shaft pinion and the other meshing with the gear of the driven shaft, substantially as described.

5. The combination of a driving-shaft, a pinion thereon, a driven shaft, a gear for driving said shaft, a two-part casing, a bearing-disk mounted in the casing, said casing being eccentric to the driving-shaft, a series of shafts on the casing, each shaft having a gear at each end, the several gears varying in diameter and so proportioned that any one of the shafts can be moved into operative position with the driving-shaft and the driven shaft, means for turning the bearing-disk, and means for locking the two-part casing after the disk is turned, substantially as described.

6. The combination of a casing, a bearing-disk mounted in the casing, a series of transmitting-spindles carried by the said bearing-disk, gears on each end of said spindles, a driving-shaft having a pinion with which one set of gears mesh, a driven spindle having a gear with which the other set of gears mesh, lubricant-ducts in the bearing-disk communicating with the bearings for each transmitting-spindle, a fixed lubricator on the casing arranged to aline with the duct of the transmitting-spindle which is entrain with the driving-shaft and driven spindle, substantially as described.

7. The combination of a driven shaft, a sleeve thereon, a gear on the sleeve, a driving-shaft, a pinion thereon, a two-part casing, a bolt and handled nut for clamping the two parts of the casing together, a circular bearing-disk mounted in the casing and having an annular rib thereon fitting an annular recess in the casing, an annular rack on the bearing-disk, a pinion with which the rack engages, a handled shaft for turning said pinion, a spring-pin carried by the casing and arranged to enter notches in the bearing-disk, a series of shafts extending through the bearing-disk, a gear-wheel on each end of each shaft, the said gear-wheels varying in diameter, the driving-shaft being eccentric to the bearing-disk so that only one shaft of the bearing-disk will be in motion when power is transmitted from the driving to the driven shaft, substantially as described.

In testimony whereof I have signed my name to this specification in the presence of two subscribing witnesses.

ISRAEL H. JOHNSON, Jr.

Witnesses:
　WILL. A. BARR,
　JOS. H. KLEIN.